United States Patent [19]

Nakajima

[11] Patent Number: 5,237,412
[45] Date of Patent: Aug. 17, 1993

[54] SIGNAL RECORDING AND/OR REPRODUCING APPARATUS

[75] Inventor: Yasuhisa Nakajima, Kanagawa, Japan

[73] Assignee: Sony Corporation, Tokyo, Japan

[21] Appl. No.: 827,415

[22] Filed: Jan. 29, 1992

[30] Foreign Application Priority Data

Jan. 31, 1991 [JP] Japan ............................. 3-032090

[51] Int. Cl.$^5$ ............................................. H04N 7/087
[52] U.S. Cl. ...................................... 358/147; 358/335
[58] Field of Search ............... 358/142, 146, 147, 335; 360/9.1, 33.1, 24

[56] References Cited

U.S. PATENT DOCUMENTS 4,543,616 9/1985 Brooks ................................ 358/335

Primary Examiner—John K. Peng
Assistant Examiner—David E. Harvey
Attorney, Agent, or Firm—Lewis H. Eslinger; Jay H. Maioli

[57] ABSTRACT

A signal recording and/or reproducing apparatus can record and/or reproduce a character information, which could not be sufficiently demodulated conventionally, together with a video signal, by deriving a program information signal S9 from a character signal S8 transmitted as multiplexed with the video signal S1, outputting it to a control circuit 12, coding or decoding only character information S5 corresponding to a program information selected by a user at a clock lower than a broadcasting signal, re-inserting it into the video signal S4 and recording and/or reproducing the combined signals.

2 Claims, 5 Drawing Sheets

SIGNAL RECORDING AND/OR REPRODUCING APPARATUS

BACKGROUND OF THE INVENTION

This invention relates to a signal recording and/or reproducing apparatus, and is suitably applied to a video tape recorder for recording and/or reproducing, for example, character information multiplexed with a television broadcasting signal.

Conventionally, in a character multiplexed broadcasting in which character information is transmitted by multiplexing it with a television broadcasting signal, a character signal constituted of characters is inserted into a horizontal scan period (10-21 h) within a vertical blanking period as a digital signal and transmitted (FIG. 1(A)).

Here, the character signal is transmitted as a data line composed of 296 bits per one horizontal scan period and the data line is constituted with a synchronizing portion of 24 bits and a data packet of 272 bits.

The data packet is constituted with a prefix (PFX) of 14 bits for controlling the multiplex transmission, a data block of 176 bits and a check code of 82 bits (FIG. 1(B)) and a plurality of such data blocks form a data group (FIG. 1(C)).

Here, a head of the data group is constituted with a data group header for identification and control of the data group and comprises a data group identification signal (DGI), a data group retransmission signal (DGR), a data group link code (DGL), a data group serial number (DGC), a data group size (DGS) and operation data, in that order (FIG. 2).

A plurality of such data groups form a program data and a program management data is transmitted by No. 0 data group among respective data groups and a first page data through Nth page data are transmitted by a first through Nth data groups.

Incidentally, in order to receive a character multiplexed broadcasting at high quality (bit error is not more than 0.005 and eye opening rate is not smaller than 50%) and to record or reproduce on a magnetic tape by using a video tape recorder, it is necessary to make a band characteristics to have not more than −3 [db] at 3.58 [MHz] and to make a group delay characteristics flat at not higher than 3 [MHz].

Previously, there was a problem that, in a case where a character multiplex broadcasting having a band in the order of 5.72 [MHz] is recorded or reproduced by a video tape recorder, particularly, in reproducing, it is difficult to realize this condition and a demodulation in recording or reproducing a character multiplex broadcasting by means of a video tape recorder is difficult.

SUMMARY OF THE INVENTION

In view of the foregoing, an object of this invention is to provide a signal recording and/or reproducing apparatus capable of demodulating and recording and/or reproducing character multiplex broadcasting which could not be demodulated enough, conventionally.

The foregoing object and other objects of the invention have been achieved by the provision of a signal recording and/or reproducing apparatus for recording, on a recording medium 6, wherein character information S7 multiplexed with television broadcasting signal S1 and transmitted or reproducing it from the recording medium 6, comprises: character information separating circuit 8 for separating the character information S7 from the television broadcasting signal S1; program information detecting means 9, 12 for detecting a program information from the character information S7; program information assigning means 13 for selecting a desired program information in the program information and assigning the desired program information as a selected program information and inputting it; and a recording and/or reproducing circuit 1A and 1B for recording and/or reproducing the character information S5 corresponding to the selected program information at a clock S11 lower than a reference clock; only the character information which corresponds to the selected program information is re-inserted into the television signal S4 with its data rate being dropped and recorded on the recording medium 6 or reproduced therefrom.

It is possible to record and/or reproduce character information, which could not be sufficiently demodulated conventionally, together with a television broadcasting signal S1 by separating the character information from the television broadcasting signal through a character information separating circuit 8, re-inserting only a selected character information among the character information which is assigned by a user into a television signal S4 at a clock lower than a reference clock ad recording and/or reproducing it.

The nature, principle and utility of the invention will become more apparent from the following detailed description when read in conjunction with the accompanying drawings in which like parts are designated by like reference numerals or characters.

DETAILED DESCRIPTION OF THE INVENTION

Figure 4:
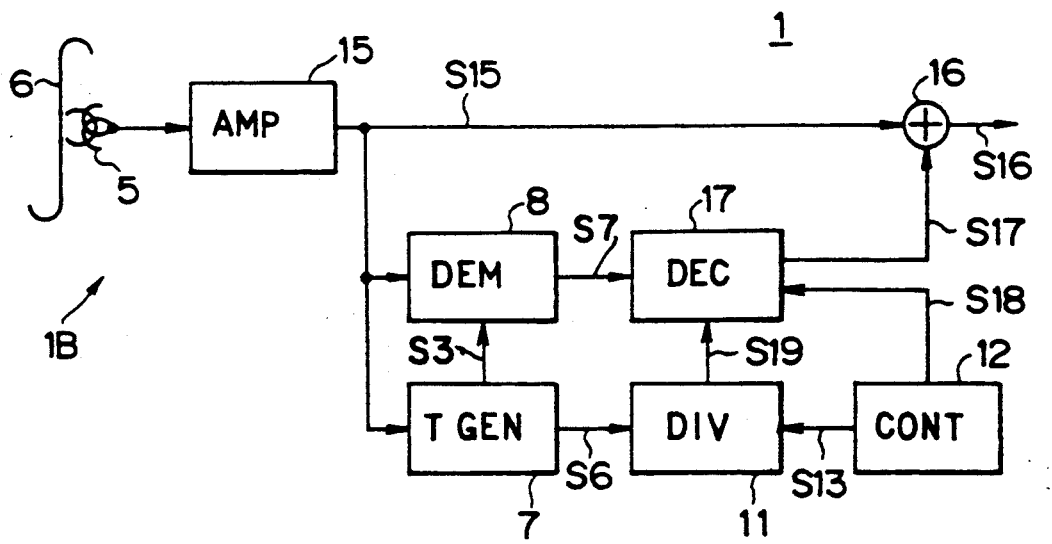
FIG. 4 is a block diagram showing an embodiment of a reproducing circuit portion of the signal recording and/or reproducing apparatus according to the present invention.
Figure 3:
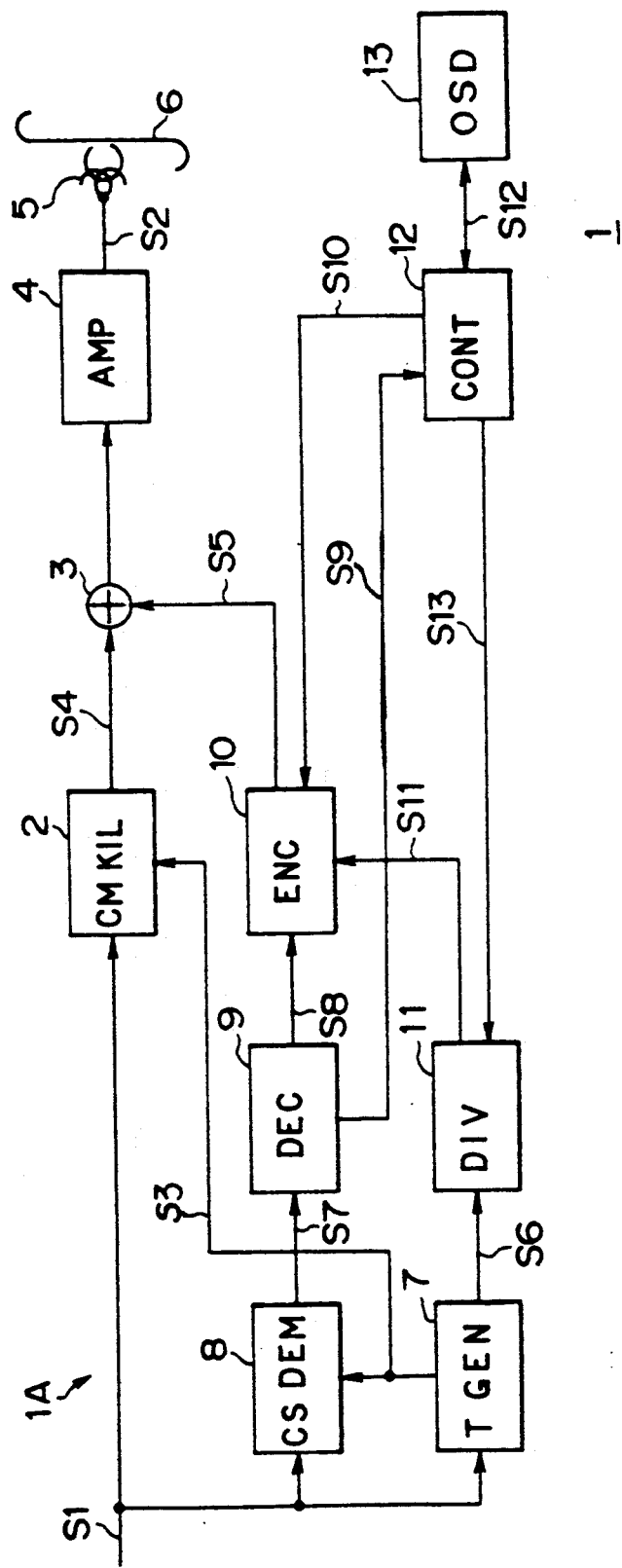
FIG. 3 is a block diagram showing an embodiment of a recording circuit portion of a signal recording and/or reproducing apparatus according to the present invention.

Preferred embodiments of this invention will be described with reference to the accompanying drawings:

In FIGS. 3 and 4, a video tape recorder 1 is constituted with a recording circuit portion 1A (FIG. 3) and a reproducing circuit portion 1B (FIG. 4).

The recording circuit portion 1A records a television signal S1 passed through a character multiplex killer circuit 2, a re-inserting circuit 3, an amplifier circuit 4 and a magnetic head 5, in sequence, on a magnetic tape 6 as a recording video signal S2.

The character multiplex killer circuit 2 responds to a gate pulse signal S3 from a timing generator circuit 7 to remove a character signal from the television signal S1 and output a video signal S4 to the re-inserting circuit 3.

The re-inserting circuit 3 is composed of an adder circuit and re-inserts user-selected character information among character information demodulated through a character signal demodulator circuit 8, a decoder 9 and an encoder 10 into the video signal S4 as a recording character signal S5.

The demodulator circuit 8 is composed of a slicer which corresponds to the gate pulse signal S3 from the timing generator circuit 7 to separate a character signal S7 from the television signal S1 whose wave is equalized and output it to the decoder 9.

In this case, the timing generator circuit 7 generates the gate pulse signal for deriving the character signal by separating a vertical and a horizontal synchronizing signals from the television signal S1, generates a clock signal S6 used as a reference pulse for an identification of a sign of the separated character signal and a decoding thereof on a bit by bit basis and outputs it to a frequency divider circuit 11.

The decoder 9, then decodes the character signal S7, outputs a character information signal S8 to the encoder 10 and outputs a character information signal S9 composed of program managing data, etc., to a control/circuit 12 and displays it on display OSC (on screen display) 13.

The encoder 10 outputs the user-selected character information among the character information signal S8 as a recording character signal S5 on the basis of an information selecting signal S10 from the control circuit 12.

In this case, the encoder 10 converts the selected character information into the recording character signal S5 at a timing of the reference clock S11 given by the frequency divider circuit 11.

The control circuit 32 takes in the user-selected character information from the on screen display 13 as the selecting information signal 12.

Since the band necessary to transmit character information is limited by transmission characteristics to −3 [db] at 1.5 [MHz] which is about 3/7 of a total amount of information (3.58 [MHz], −3 [db]), the control circuit 12 outputs a frequency dividing ratio data S13 for dividing frequency of the clock signal S6 to 3/7 to the frequency divider circuit 11 to that quality of the recording character signal S5 can be maintained at the same level as that of the video signal.

Further, the control circuit 12 outputs all of the selected character information to the encoder 10 as an information selecting signal S10 when an information amount of the user-selected character information is not more than 3/7 of the total information amount (3.58 [MHz], −3 [db] and outputs the selecting information signal S12 to the on screen display 13 when it is not less than 3/7 times, so that a priority of character information is selected.

Figure 5A:
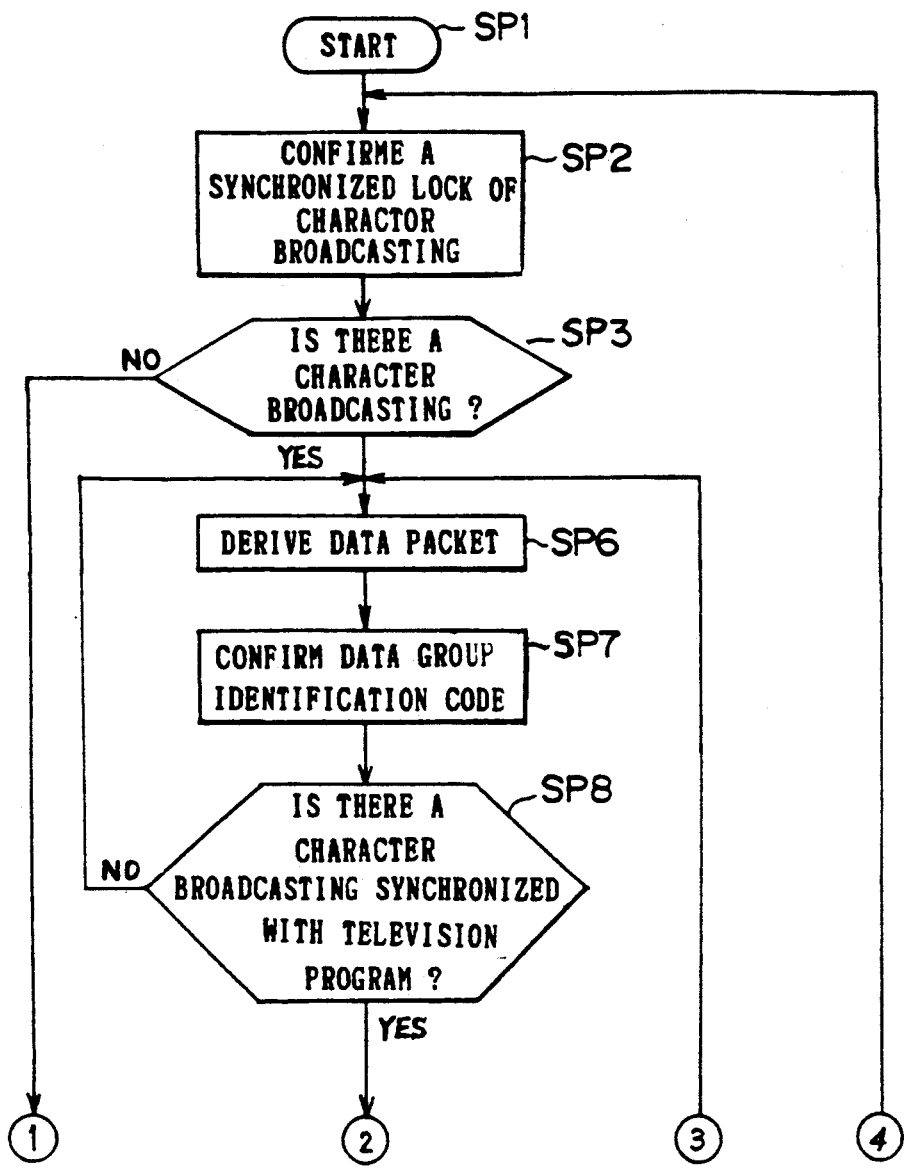
FIGS. 5A and 5B are flow charts showing processing procedures of a control circuit according to the present invention.
Figure 5B:
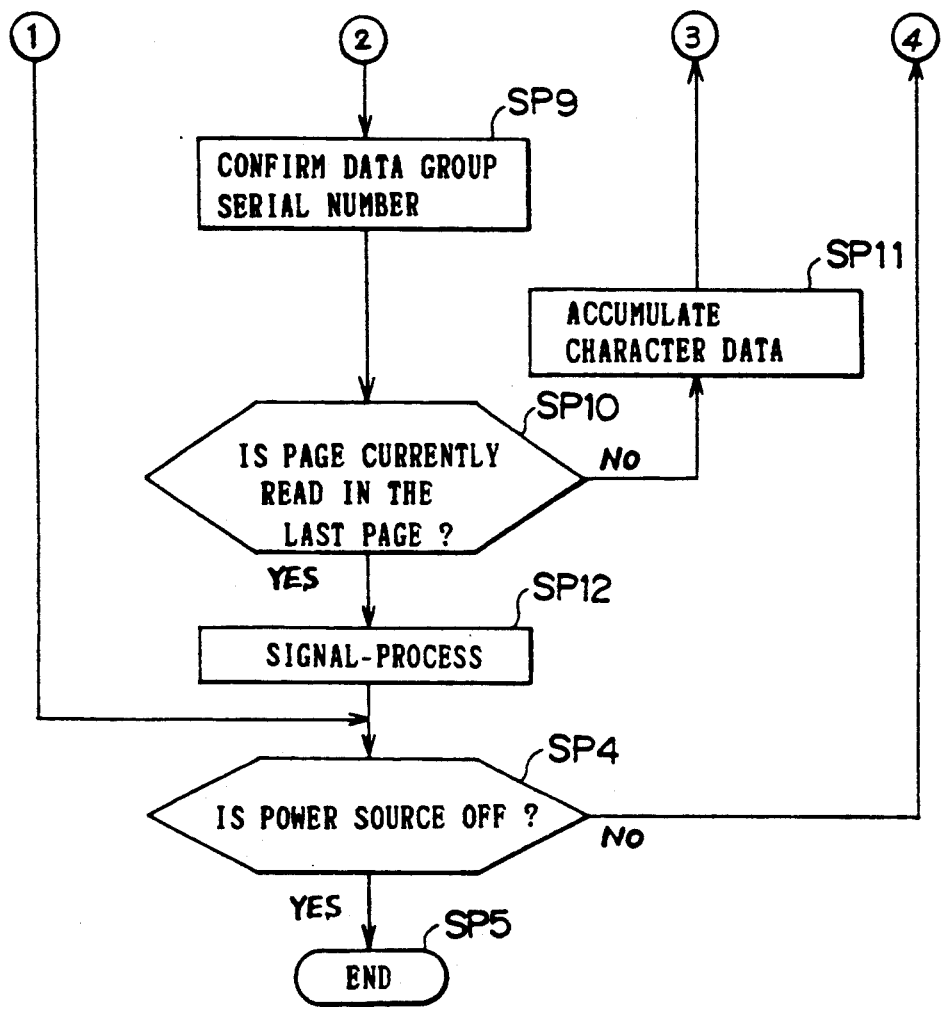

In this case, the control circuit 12 starts a character information processing according to processing procedures shown in FIGS. 5A and 5B.

The control circuit 12, starts the said signal processing from the step SP1, proceeds to the step SP2 and, after confirming a synchronized lock of character broadcasting, determines in the step SP3 whether or not there is a character broadcasting.

When a negative result is obtained, the control circuit 12 moves to the step SP4 in which it is determined whether or not a power source is off and when an affirmative result is obtained moves to the steps SP5 and terminates the process.

On the other hand, when the result in the step SP4 is negative, that is, it is determined that the power source is on, the control circuit 12 returns to the step SP2 and confirms the synchronized lock of the character broadcasting.

Figure 1:
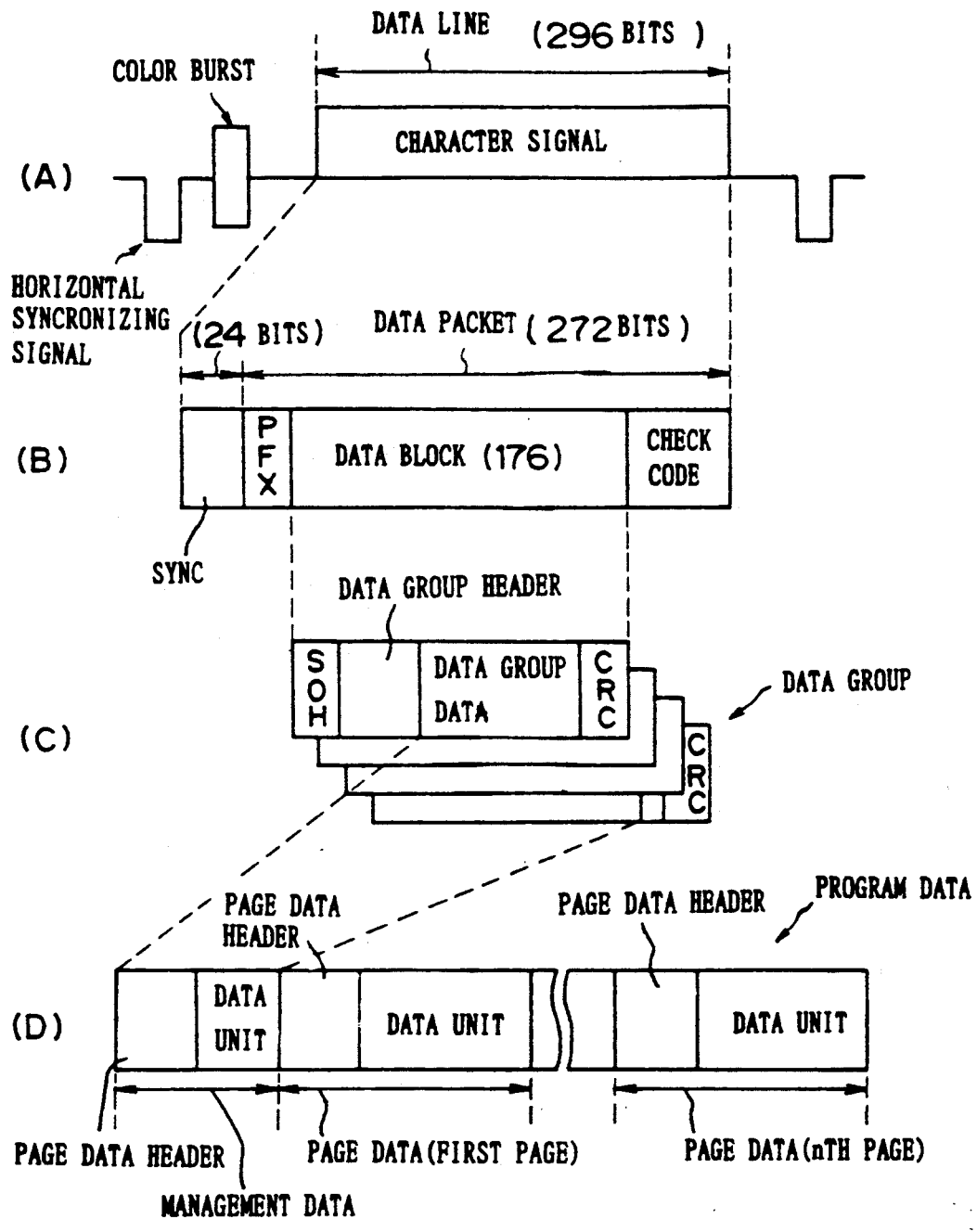
FIG. 1(A) to 1(D) are diagrams presented for explanation of program data.

The control circuit 12, when it obtains an affirmative result in the step SP3 (that is, when it detects a transmission of the character broadcasting) moves to the step SP6 to derive the data packet (FIG. 1(B)) from the data line and in the subsequent step SP7 confirms the data group identification code (FIG. 1(C)) from the data group header.

The control circuit 12 determines in the step SP8 whether or not there is a character broadcasting synchronized with the television program and when a negative result is obtained returns to the step SP6 again.

Figure 2:
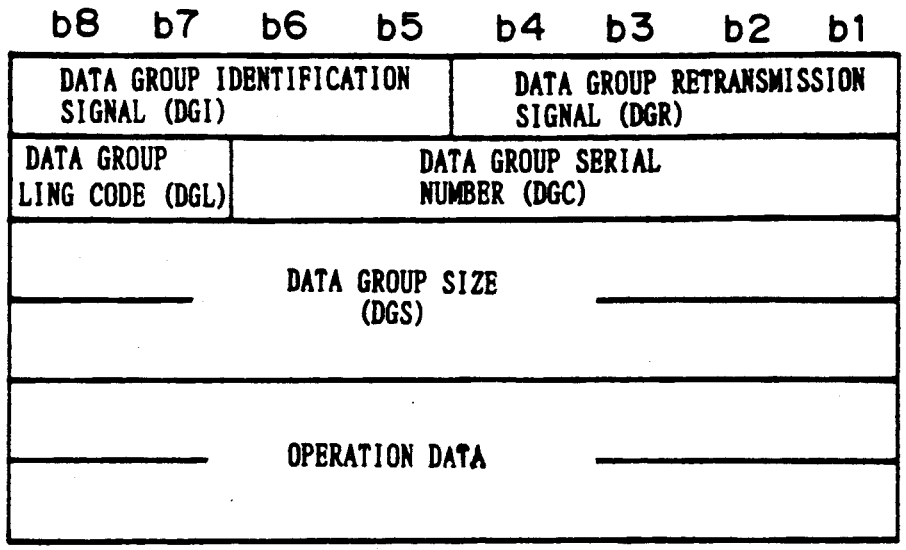
FIG. 2 is a table presented for explanation of data group header.

On the other hand, when an affirmative result is obtained (that is, when there is a character broadcasting synchronized with a television program) the control circuit 12 confirms in the step SP9 the data group serial number (FIG. 2) and moves to the step SP10.

The control circuit 12 determines in the step SP10 whether or not a page currently read in is the last page and, when a negative result is obtained (that is, it is not the last page), moves to the step SP11 and, after accumulating character data, returns to the step SP6.

On the other hand, when an affirmative result is obtained (that is, it is the last page), the control circuit 12 moves to the step SP12 to signal-processing the character data on the basis of whether or not the band of the user-selected character information is not move than 3/7 of the total information amount and then moves to the step SP4.

The reproducing circuit portion 1B, as shown in FIG. 4 with portions corresponding to those shown in FIG. 3 being attached with the same reference numerals, reads a reproduced signal S15 from the magnetic tape 6 through the magnetic head 5 and the amplifier circuit 15 and outputs it through the re-inserting circuit 16 as a reproduced video signal S16.

In this case, the demodulator circuit 8 demodulates the reproduced signal S15 at the timing of the reference clock S7 generated by the timing generator circuit 7 and sends it to the decoder 17.

The decoder 17 is controlled according to a switching signal S18 inputted from the control circuit 12 and, when the switching signal is on, outputs a reproduced character signal S17 decoded by the reference clock S19 output from frequency devider 11 t the pre-inserting circuit 16 while, when the switching signal S18 is off, stops an output of the reproduced character signal S17.

In the construction mentioned above, in a case where character information is recorded on the magnetic tape 6, the control circuit 12 takes the character information signal S9 in from the television signal S1 through the decoder 9.

In this case, the control circuit 12 confirms the synchronized lock of the character broadcasting in the steps SP1-SP3 and, when it determines a multiplexing of character broadcasting with the television signal, moves to the steps SP6-SP8.

At this time, the control circuit 12, when it reads in the data packet, reads in the data group headers from said data blocks of the said data packet in sequence, confirms identification codes of the data groups and determines whether or not the character broadcasting is synchronized with the television program.

The control circuit 12, when a character information of a character broadcasting, such as prompt news, which is independent from the program is inputted, repeats the processing in the steps SP6–SP8.

Before long, when it determines an input of character information such as lyric lines or dialogue superimposed which is synchronized with the program, the control circuit 12 moves to the step SP9 to read the data group serial number from the data group, stores character data sequentially until the currently reading data group becomes the last page in the step SP11 and continues the processing in the steps SP6–SP11.

The control circuit 12, when it detects that the program data inputting through the decoder 9 has become the last page, displays on the on screen display 13 program state information S12 in the step SP12 to display to the user the program state of the character information transmitted as multiplexed with the video signal.

The control circuit 12, when it detects that only a record of information related to the television broadcasting program is selected from the on screen display 13 by, for example, the user, determines whether or not the selected information amount is not more than 3/7 of the total information amount.

At this time, the control circuit 12, when it determines that the user-selected information amount is not more than 3/7 of the total information (that is, smaller than the band necessary to record or reproduce the character information by means of the video tape recorder), outputs the reference clock S11 which is frequency-divided by a factor of 3/7 form the encoder 10 and encodes the information selecting signal S10 to be selected.

Contrary to this, the control circuit 12, when it determines that the user-selected information amount is not less than 3/7 of the total information amount (that is, larger than the band necessary to record or reproduce the character information by means of the video tape recorder), outputs a selection signal S12 to the on screen display 13 to allow the user to determine a priority of the character information such that the information amount becomes not more than the total information amount.

After this, the control circuit 12 repeats the processing in the steps SP2, SP3 and SP6–SP12 until an off state of the power source is detected in the step SP4 and, during this time, the video tape recorder 1 re-inserts, using the re-inserting circuit 3, the user-selected character data signal S5 to the video signal S4, records it on the magnetic tape 6 through the amplifier circuit 4 and the magnetic head 5 in sequence, moves to the step SP5 after the power off is detected and terminates the said processing.

By means of this, it is possible to record necessary character information, which could not be demodulated sufficiently and recorded conventionally due to as large information amount as 5.72 [MHz], with sufficiently high quality by letting the user select character information required by him and reducing the amount of information.

On the other hand, when video signal and character information recorded on the magnetic tape 6 is reproduced by the reproducing circuit portion 1B, the reproducing circuit portion 1B takes the reproduced signal S15 reproduced through the magnetic head 5 and the amplifier circuit 15 into the demodulation circuit 8.

The demodulation circuit 8 derives character information from the reproduced signal S15 demodulated at a timing of the timing signal S3 input from the timing generator 7 and outputs it to the decoder 17.

At this time, the transmission band of the reproduced character information demodulated by the demodulation circuit 8 satisfies 3.58 [MHz] and conditions of transmission band necessary to demodulate and reproduce the character information in the video tape recorder 1.

The decoder 17 decodes this character information to three primary color signals R, G and B on the basis of clock signal S19 constituted with frequency dividing ratio of 3/7 times the reference clock S6 and outputs them.

At this time, the decoder 17, when it receives an instruction of insertion of reproduced character information by the switching signal S18 outputted from the control circuit 12, outputs the decoded reproduced character information to the re-inserting circuit 16, multiplexes on the reproduced video signal and displays the character information.

On the other hand, the decoder 17, when receives an instruction of non-display of the reproduced character information by the switching signal S18 inputted from the control circuit 12, stops an output of the decoded reproduced character information and outputs the reproduced video signal S16 containing only the video signal.

By means of this, the reproducing circuit portion 1B can reproduced the character signal, which could not be sufficiently demodulated conventionally due to large band characteristics, with high quality.

According to the construction mentioned above, it is possible to record or reproduce a character multiplexed broadcasting, which could not be demodulated sufficiently conventionally, together with a television signal by letting the user select character information required by him from the character information transmitted with the television signal, re-inserting the character information obtained by coding only a character information corresponding to the selected program information at a clock frequency divided by 3/7 times to the video signal and reproducing it.

Further, by re-inserting the character information selected by the user to the video signal after signal processed, it is possible to construct the circuit in shared manner with the conventional character multiplexed broadcasting device, so that only the required character information can be recorded or reproduced by a simple construction.

Although, in the embodiment described above, the case where the frequency dividing ratio of the reference clock is 3/7 times has been described, the present invention is not limited to this and it may be possible to set to other frequency dividing ratio according to a video tape recorder used.

Further, although, in the embodiment mentioned above, the case where the on screen display 13 is used as the character information selecting means has been described, the present invention is not limited to his and it is possible to select necessary character information by means of a key board or mouse, etc.

Further, although, in the embodiment mentioned above, the case where type character multiplexed broadcasting is recorded or reproduced under condition of −3 [dB] at 3.58 [MHz] has been described, the present invention is not limited to this and it is applicable to recording or reproducing of the character multiplexed broadcasting in other band characteristics.

Further, although, in the embodiment mentioned above, the case where the frequency band of the character information necessary for recording and/or reproducing is −3 [dB] at 1.5 [MHz] has been described, this invention is not limited to this and applicable to various conditions.

Further, although, in the embodiment mentioned above, the case where the character multiplexed broadcasting is recorded in the video tape recorder has been described, the present invention is not limited to this and applicable to various signal recording and/or reproducing apparatus such as opti-magnetic recording and/or reproducing apparatus.

As described above, according to the present invention, it is possible to record and/or reproduce a character multiplexed broadcasting, which could not be demodulated sufficiently conventionally, by separating character information multiplexed with television broadcasting signal and transmitted therewith, re-inserting the character information corresponding to a program information selected by a user to a video signal after signal-processed at a clock lower than a reference clock and recording and/or reproducing.

While there has been described in convention with the preferred embodiments of the invention, it will be obvious to those skilled in the art that various changes and modifications may be made therein without departing from the invention, and it is aimed, therefore, to cover in the appended claims all such changes and modifications as fall within the true spirit and scope of the invention.

What is claimed is:

1. A signal recording and/or reproducing apparatus for recording, on a recording medium, character information multiplexed with a television broadcasting signal or reproducing it from the recording medium, said recording and/or reproducing apparatus characterized by comprising:

a character information separating circuit for separating the character information from the television broadcasting signal;

decoding means for decoding the character information and separating program information data from the character information;

an on-screen display;

control means receiving said program information data and feeding said data to said on-screen display for display to a user for selecting a desired character information based on the displayed program information data, said control means producing an information selecting signal corresponding to the selected desired character information;

a recording and/or reproducing circuit for recording and/or reproducing the character information corresponding to the selected desired character information at a clock lower than a reference clock in response to a clock control signal from said control means; and said recording and/or reproducing circuit including an encoder receiving said character information from said separating circuit and said information selecting signal from said control means, so that only the character information which corresponds to the selected character information is re-inserted into the television signal with its data rate being lowered and recorded on the recording medium or reproduced therefrom.

2. The signal recording and/or reproducing apparatus according to claim 1, further comprising:

a frequency dividing circuit responsive to said clock control signal from said control means for obtaining said clock lower than the reference clock by dividing the reference clock at a dividing ratio 3/7 times the reference clock.

* * * * *